United States Patent
Henry et al.

(10) Patent No.: US 9,181,888 B2
(45) Date of Patent: Nov. 10, 2015

(54) SELECTIVELY TRAPPING AND STORING $SO_3$ IN AN EXHAUST GAS EFFLUENT

(71) Applicant: Cummins Inc., Columbus, IN (US)

(72) Inventors: Cary Henry, Helotes, TX (US); Aleksey Yezerets, Columbus, IN (US); Neal W. Currier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/064,603

(22) Filed: Oct. 28, 2013

(65) Prior Publication Data

US 2015/0113949 A1    Apr. 30, 2015

(51) Int. Cl.
| | |
|---|---|
| *F01N 3/00* | (2006.01) |
| *F01N 3/10* | (2006.01) |
| *F01N 3/02* | (2006.01) |
| *F02D 41/02* | (2006.01) |
| *B01D 53/94* | (2006.01) |
| *F01N 3/08* | (2006.01) |
| *F01N 3/20* | (2006.01) |

(52) U.S. Cl.
CPC ............ *F02D 41/0285* (2013.01); *B01D 53/94* (2013.01); *F01N 3/085* (2013.01); *F01N 3/2066* (2013.01)

(58) Field of Classification Search
CPC ........ F01N 3/085; F01N 3/10; F01N 2570/04
USPC .................... 60/274, 285, 295, 297, 301, 311
See application file for complete search history.

(56) References Cited

U.S. PATENT DOCUMENTS

| | | | | |
|---|---|---|---|---|
| 6,145,303 | A | * | 11/2000 | Strehlau et al. ................. 60/274 |
| 6,640,752 | B1 | | 11/2003 | Counterman |
| 6,939,523 | B2 | | 9/2005 | D'Alesandro |
| 6,978,601 | B1 | | 12/2005 | Twigg |
| 7,291,576 | B2 | | 11/2007 | McCabe et al. |
| 7,332,143 | B2 | | 2/2008 | Symrnoiotis et al. |
| 7,389,638 | B2 | | 6/2008 | Weissman et al. |
| 2001/0035006 | A1 | * | 11/2001 | Dou et al. ........................ 60/274 |
| 2002/0033017 | A1 | * | 3/2002 | Bruggemann et al. .......... 60/295 |
| 2003/0049191 | A1 | | 3/2003 | Twigg |
| 2007/0144143 | A1 | | 6/2007 | Kaneeda et al. |
| 2007/0175206 | A1 | * | 8/2007 | Mital et al. ...................... 60/286 |
| 2008/0307779 | A1 | | 12/2008 | El-Malki et al. |
| 2009/0277363 | A1 | | 11/2009 | Shibata et al. |

(Continued)

FOREIGN PATENT DOCUMENTS

| | | |
|---|---|---|
| EP | 0773056 A1 | 5/1997 |
| EP | 0815925 A1 | 1/1998 |
| EP | 0854751 | 4/2006 |

(Continued)

OTHER PUBLICATIONS

PCT/US2014/061142 International Search Report and Written Opinion, Dec. 31, 2014, 6 pages.

*Primary Examiner* — Audrey K Bradley
(74) *Attorney, Agent, or Firm* — Taft, Stettinius & Hollister LLP

(57) ABSTRACT

Systems, apparatus, and methods for selectively, preferentially, and/or actively removing or trapping $SO_3$ from un-oxidized sulfur constituents in an exhaust gas effluent produced by an internal combustion engine are disclosed. Also disclosed are embodiments for regenerating an $SO_3$ trap.

20 Claims, 2 Drawing Sheets

(56) References Cited

U.S. PATENT DOCUMENTS

2010/0071348 A1   3/2010   Kobayashi et al.
2010/0275586 A1*  11/2010  Hirata et al. .................. 60/299

FOREIGN PATENT DOCUMENTS

| JP | 59134311 A | 8/1984 |
| WO | WO2004071626 | 8/2004 |

* cited by examiner

SELECTIVELY TRAPPING AND STORING SO₃ IN AN EXHAUST GAS EFFLUENT

TECHNICAL FIELD OF THE APPLICATION

This application is related to aftertreatment systems for an internal combustion engine, and more particularly to a system, apparatus and method for selectively trapping and storing sulfur trioxide ($SO_3$) in an exhaust gas effluent from an internal combustion engine.

BACKGROUND

The amount of sulfur in diesel fuel can vary greatly depending on the market in which the fuel is sold and the regulatory requirements in the markets. Sulfur in diesel fuel can adsorb/absorb onto aftertreatment system components and reduce their performance. In aftertreatment systems in which there is no active regeneration of a diesel particulate filter, the exhaust temperature often is not high enough to remove the adsorbed sulfur to restore performance of the aftertreatment component. In addition, for systems which include thermal particulate filter regeneration, the need to regenerate the particulate filter due to sulfur adsorption on aftertreatment system components decreases efficiency and fuel economy. Furthermore, systems which include sulfur traps that accumulate sulfur during operation may require frequent replacement of the sulfur trap due to the high sulfur accumulation on the trap. Therefore there remains a need for further improvements in this technology area.

SUMMARY

Embodiments include a unique system, apparatus, and method for selectively, preferentially, and or actively removing or trapping $SO_3$ from un-oxidized sulfur constituents in an exhaust gas effluent produced by an internal combustion engine. Also disclosed are embodiments for regenerating an $SO_3$ trap. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
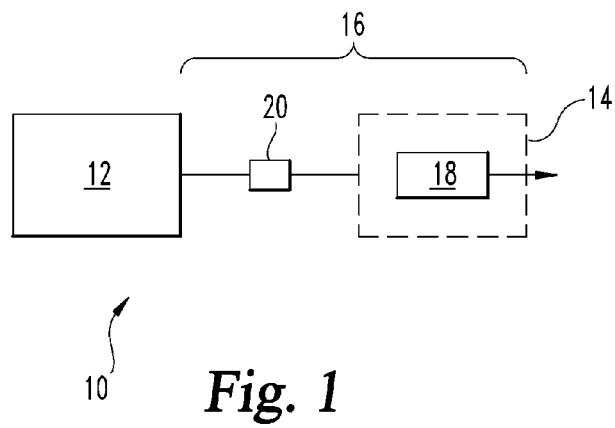
FIG. 1 is a schematic of an internal combustion engine system including an $SO_3$ trap upstream of an aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, there is shown a system 10 that includes an internal combustion engine 12, and an aftertreatment system 14 in an exhaust system 16 that is operably coupled to engine 12. Engine 12 utilizes a sulfur containing fuel for combustion to produce an output torque to satisfy a load demand or load request. As a result of the combustion of the sulfur containing fuel, sulfur constituents are produced in the combustion process and output to exhaust system 16. Aftertreatment system 14 includes catalyzed aftertreatment components, such as a selective catalytic reduction (SCR) catalyst 18, that adsorb sulfur constituents in the exhaust gas. Adsorption of sulfur reduces the performance capability of the catalyzed aftertreatment component.

The inventors have determined that sulfur trioxides ($SO_3$) is the sulfur constituent in the exhaust gas effluent most responsible for the loss of performance in catalyzed aftertreatment components. The remaining sulfur constituents in the exhaust gas effluent have been determined to have relatively little impact on the catalyzed aftertreatment component performance. In FIG. 1 system 10 includes a trap 20 that preferentially and selectively traps $SO_3$ in the exhaust gas effluent, allowing the remaining portion of the sulfur constituents to pass to the catalyzed aftertreatment component without significant impact on the performance of the catalyzed component. Since the fraction of $SO_3$ compared to the balance of the remaining sulfur constituents is relatively small, trap 20 can be of reduced size relative to traps that are configured to trap sulfur constituents that include more than the $SO_3$ produced by combustion of the fuel in engine 12.

The targeted trapping of $SO_3$ actually produced by fuel combustion in the engine 12 eliminates the need for any oxidation catalyst or other conversion device upstream of trap 20. As a result, trap 20 may not need replacement or even regeneration over the operating lifetime of engine 12. Thus, in one embodiment, trap 20 is implemented in an exhaust system 16 that completely lacks regeneration capability and/or that completely lacks any oxidation component upstream of trap 20.

While an SCR catalyst 18 is one example of a catalyzed aftertreatment component, the catalyzed aftertreatment component may further be any one of combination of a diesel oxidation catalyst, a diesel particulate filter, and a vanadia SCR catalyst, for example. In addition, aftertreatment system 14 may include other components, such as reductant dosing systems, hydrocarbon dosing systems, decomposition chambers, ammonia oxidation catalysts, and the like.

Trap 20 may include any suitable sulfur trapping structure that includes a sulfur trapping material having a basic nature. Suitable trapping structures include a mesh or net structure made entirely of sulfur trapping material, or having a coating of sulfur trapping material. Trap 20 may also include a porous structure or a cellular substrate of trapping material, or other structure that provides a suitable surface area of trapping material to which the $SO_3$ adsorbs. Suitable sulfur trapping materials include a high desorption deactivation energy so that the $SO_3$ remains adsorbed to the surfaces of trap 20 and will not desorb in appreciable quantities under typical operating conditions and temperatures of exhaust system 16. The materials of trap 20 further preferentially trap the highly acidic $SO_3$ molecules, have limited activity in converting $SO_2$ to $SO_3$, and permit the less acidic $SO_2$ and other remaining sulfur constituents in the exhaust gas effluent to pass to the catalyzed aftertreatment component while adsorbing $SO_3$.

In certain embodiments the material of basic nature comprising the trapping material includes at least one of a metal, a metal oxide, and a salt. In further embodiments, the material includes at least one of Cs, Mg, Ca, Sr, Ti, La, Ce, and Pr. The trapping material may be present as an oxide or carbonate, or present as mixed oxides, mixed carbonates, or mixed oxides of transitional metals such as dolomite.

Since the amount of $SO_3$ produced by engine 12 and trapped during operation of engine 12 is small, trap 20 can be sized to accommodate long operating periods of engine 12 between service events. In one embodiment, the operating periods between required service events are predetermined, and can be selected to correspond to 100,000 miles, 250,000 miles, 500,000 miles, 750,000 miles, or 1,000,000 miles of operation. In another embodiment, the operating period is a planned service life of engine 12. Other predetermined operating periods can be measured by other criteria, including operating hours, operation time or miles in high load conditions, the quantity of sulfur containing fuel that is consumed, and/or the cumulative sulfur content of the fuel that is consumed, for example.

In certain embodiments, the system 10 further includes a controller 22 structured to perform certain operations to regenerator a trap 20 that selectively traps $SO_3$ constituents. In certain embodiments, the controller 22 forms a portion of a processing subsystem including one or more computing devices having memory, processing, and communication hardware. The controller may be a single device or a distributed device, and the functions of the controller may be performed by hardware or software.

In certain embodiments, the controller 22 includes one or more modules structured to functionally execute the operations of the controller. In certain embodiments, the controller 22 includes an $SO_3$ trap status module 26, a regeneration opportunity module 28, and a regeneration control module 30. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
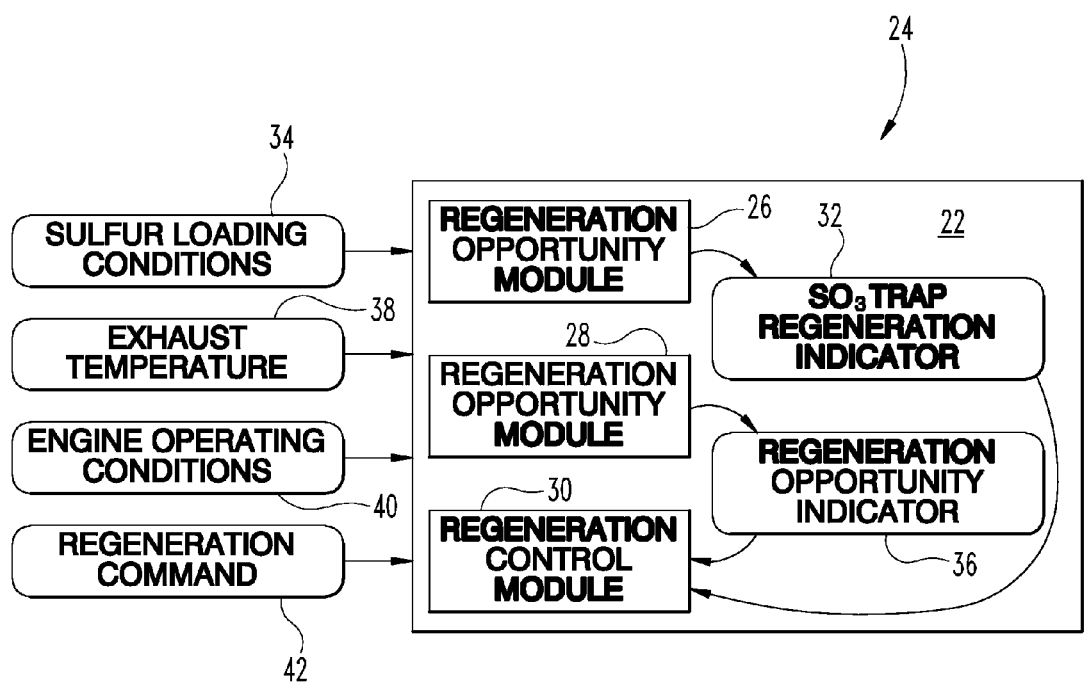
FIG. 2 is a schematic of an apparatus configured to periodically regenerate an $SO_3$ trap.

FIG. 2 is a schematic illustration of a processing subsystem 24 including controller 22. Controller 22 includes $SO_3$ trap status module 26 structured to interpret an $SO_3$ trap regeneration indicator 32. The $SO_3$ trap regeneration indicator 32 can be interpreted in response to a sulfur loading condition input 34. Sulfur loading conditions can be determined by any one or combination of a sulfur amount determination on trap 22, a predetermined interval of operation of trap 22, or a predetermined level of exhaust or sulfur passing through trap 22. Other indications for sulfur loading on trap 20 are also contemplated. A positive $SO_3$ trap regeneration indicator 32 indicates that trap 20 requires or can have improved performance capabilities through regeneration to reduce the loading of $SO_3$ thereon.

Controller 22 also includes regeneration opportunity module 28 structured to determine an $SO_3$ trap regeneration opportunity indicator 36. A positive $SO_3$ trap regeneration opportunity indicator 36 can be provided when exhaust temperature conditions 38 exceed a predetermined threshold. In one embodiment, the predetermined threshold exhaust temperature is 350° C. In addition, a positive $SO_3$ trap regeneration indicator 36 can be provided when engine operating conditions 40 of engine 12 indicate that exhaust temperatures can be increased. For example, a high engine loading condition with a steady state operation for a predetermined time period can be required before a regeneration opportunity is available. Regeneration opportunity availability can also require a predetermined period of operation to elapse since a prior regeneration event occurred.

Controller 22 further includes regeneration control module 30 structured to provide exhaust conditions to remove at least a portion of the trapped $SO_3$ from trap 20. Regeneration control module 30 provides a regeneration command 42 in response to a positive $SO_3$ trap regeneration indicator 32 and a positive regeneration opportunity indicator 36. Regeneration command 42 operates engine 12 and exhaust system 16 in a manner that produces exhaust gas above the predetermined threshold exhaust temperature, such as 350° C., for a length of time sufficient to remove $SO_3$ from trap 20 to improve performance of trap 20.

The schematic flow diagram and related description which follows provides an illustrative embodiment of performing procedures for selectively removing $SO_3$ from an exhaust gas effluent. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Figure 3:
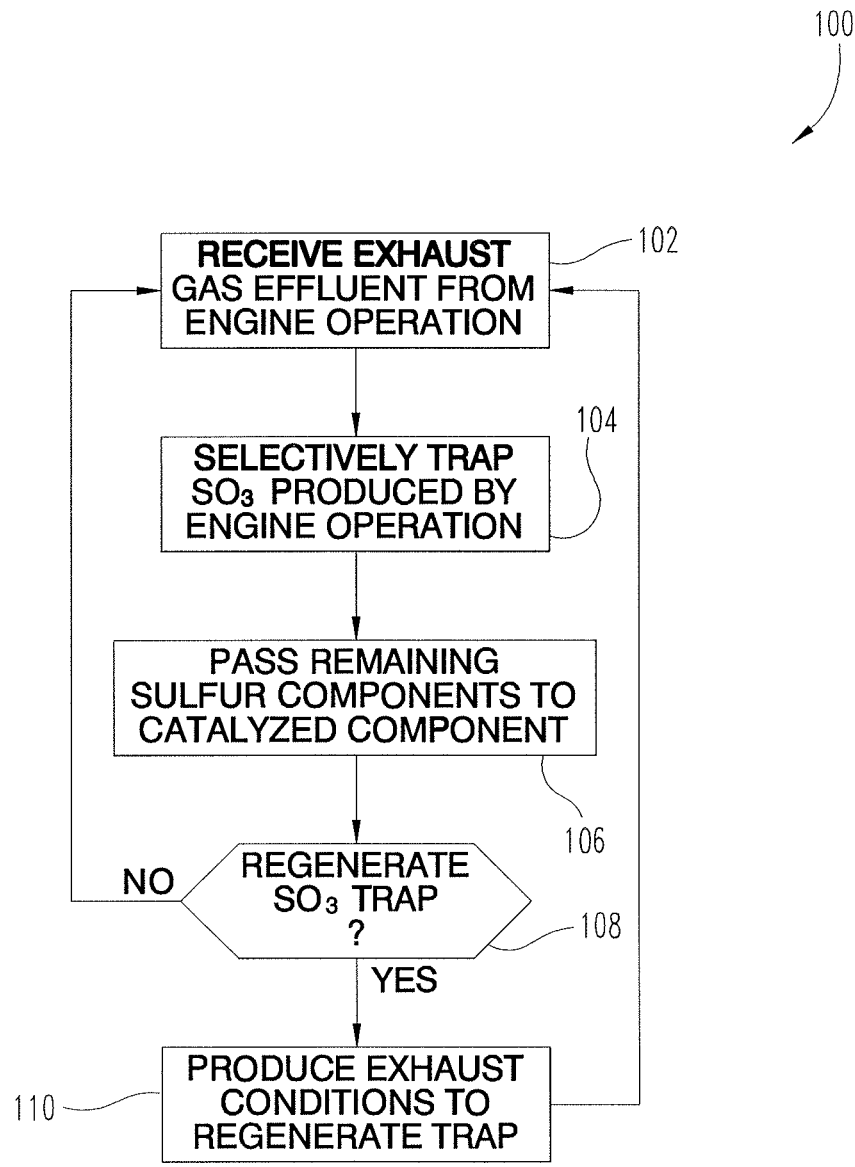
FIG. 3 is a flow diagram of a procedure for selectively trapping $SO_3$ from an exhaust gas effluent.

Referring to FIG. 3, there is shown a procedure 100 that includes an operation 102 for receiving an exhaust gas effluent from an internal combustion engine 12. The exhaust gas effluent produced by engine 12 combusting a sulfur containing fuel contains sulfur including a fraction of $SO_3$ and a remaining portion of sulfur constituents. Procedure 100 further includes an operation 104 for selectively trapping the fraction of $SO_3$ from the sulfur in the exhaust gas effluent upstream of a catalyzed aftertreatment component. The selective trapping of the fraction of $SO_3$ permits an operation 106 in which the remaining portion of the sulfur constituents pass to the catalyzed aftertreatment component.

In one embodiment, the exhaust gas effluent and its sulfur constituents remain un-oxidized upstream of trap 20, minimizing the sulfur loading on trap 20 and providing a long operation life for trap 20 between service events, if any, and further allowing trap 20 to be utilized in systems 10 that lack regenerative capability. As a result, engine 102 can be operated for a predetermined operating period without regenerating the trap 20. The predetermined operating period can include a planned service life of the engine, or can be preselected based on a usage condition of engine 102.

In another embodiment illustrated in FIG. 3, procedure 100 includes a conditional 108 to determine whether to regenerate $SO_3$ trap 20. A determination that trap 20 is to be regenerated can include a determination that $SO_3$ loading conditions on trap 20 exceed a threshold and a determination that engine and exhaust operating conditions are available to complete the regeneration. If conditional 108 is negative, procedure 100 returns to operation 102. If condition 108 is positive, procedure 100 includes an operation to operate engine 102 and/or other components of system 100, such as an exhaust gas recirculation system, a wastegate valve or intake of a turbine of a turbocharger, an intake throttle, charge flow cooling, fuel injection timing, or combinations of these to produce exhaust conditions to regenerate trap 20. In one embodiment, system 10 is controlled to produce exhaust temperatures that exceed 350° C. for a period of time sufficient to remove a substantial portion of $SO_3$ adsorbed on trap 20. For example, in a vanadia-type SCR catalyst 18, heating of $SO_3$ constituents on trap 20 and the downstream catalyst to a temperature of greater than 350° C. does not result in catalyst poisoning.

As is evident from the figures and text presented above, a variety of embodiments according to the present disclosure are contemplated.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
producing an exhaust gas effluent from an internal combustion engine containing sulfur including a fraction of $SO_3$ and a remaining portion of sulfur constituents;
selectively trapping the fraction of $SO_3$ produced by the internal combustion engine from the sulfur in the exhaust gas effluent upstream of a catalyzed aftertreatment component while limiting activity in oxidizing $SO_2$ to $SO_3$ in the remaining portion of the sulfur constituents so the fraction of $SO_3$ that is trapped is smaller than the remaining portion of the un-oxidized sulfur constituents; and
passing the remaining portion of the un-oxidized sulfur constituents to the catalyzed aftertreatment component.

2. The method of claim 1, further comprising receiving the un-oxidized sulfur constituents in an $SO_3$ trap before selectively trapping the fraction of $SO_3$.

3. The method of claim 1, further comprising operating the internal combustion engine for a predetermined operating period without regenerating the trap.

4. The method of claim 3, wherein the predetermined operating period comprises a planned service life of the engine.

5. The method of claim 3, wherein the predetermined operating period comprises an operating period selected from the operating periods consisting of 100,000 miles, 250,000 miles, 500,000 miles, 750,000 miles, and 1,000,000 miles.

6. A system, comprising:
an internal combustion engine utilizing at least one of a sulfur containing fuel and a sulfur containing lubricant to produce an exhaust gas effluent containing sulfur with a fraction of $SO_3$ and a remaining portion of sulfur constituents; and
an exhaust system operationally coupled to the internal combustion engine to receive the exhaust gas effluent, the exhaust system including a trap and a catalyzed aftertreatment component downstream of the trap, wherein the exhaust system is configured to transmit un-oxidized sulfur to the trap and the trap is configured to preferentially trap the fraction of $SO_3$ produced by the internal combustion engine while providing limited activity in oxidizing $SO_2$ to $SO_3$ in the remaining portion of the sulfur constituents so the fraction of $SO_3$ that is trapped is smaller than the remaining portion of the un-oxidized sulfur constituents and pass the remaining portion of the un-oxidized sulfur constituents to the catalyzed aftertreatment component.

7. The system of claim 6, wherein the catalyzed aftertreatment component comprises one of a diesel oxidation catalyst, a diesel particulate filter, and a vanadia-selective catalytic reduction (SCR) catalyst.

8. The system of claim 6, wherein the trap is sized to operate for a predetermined operating period between service events.

9. The system of claim 8, wherein the predetermined operating period comprises an operating period selected from the operating periods consisting of 100,000 miles, 250,000 miles, 500,000 miles, 750,000 miles, and 1,000,000 miles.

10. The system of claim 6, wherein the trap comprises a material having a basic nature.

11. The system of claim 10, wherein the material includes a basic nature comprising at least one of a metal, a metal oxide, and a salt.

12. The system of claim 11, wherein the material comprises at least one material selected from the materials consisting of Cs, Mg, Ca, Sr, Ti, La, Ce, and Pr.

13. The system of claim 12, wherein the material is present as one of an oxide and a carbonate.

14. The system of claim 13, wherein the material is present as one of a mixed oxide, a mixed carbonate, and a transitional metal.

15. A system, comprising:
an internal combustion engine utilizing a sulfur containing fuel and operable to produce an exhaust gas effluent including sulfur constituents;
a catalyzed aftertreatment component operationally coupled to the internal combustion engine to receive the exhaust gas effluent; and
a trap that receives un-oxidized sulfur constituents in the exhaust gas effluent from the internal combustion engine, wherein the trap is configured to selectively remove an $SO_3$ fraction produced by the internal combustion engine from the un-oxidized sulfur constituents of the exhaust gas effluent at a position upstream of the catalyzed aftertreatment component, limit activity in oxidizing $SO_2$ to $SO_3$ in the sulfur constituents so the $SO_3$ fraction that is trapped is smaller than a remaining portion of the un-oxidized sulfur constituents, and pass the remaining portion of the un-oxidized sulfur constituents to the catalyzed aftertreatment component.

16. The system of claim 15, wherein the sulfur containing fuel comprises a sulfur level greater than a sulfur level selected from the sulfur levels consisting of (by weight) 10 ppm, 15 ppm, 50 ppm, 200 ppm, 350 ppm, 500 ppm, and 1000 ppm.

17. The system of claim 15, wherein the trap comprises an $SO_3$ trap, and the internal combustion engine is operable to produce the exhaust gas effluent at a temperature that removes the trapped $SO_3$ from the $SO_3$ trap.

18. The system of claim 17, wherein the catalyzed aftertreatment component comprises a vanadia-selective catalytic reduction (SCR) catalyst, and wherein the temperature of the exhaust that removes the trapped $SO_3$ from the $SO_3$ trap exceeds 350° C.

19. The system of claim 18, further comprising a controller connected to the internal combustion engine and at least one of the catalyzed aftertreatment component and the $SO_3$ trap, the controller comprising:

an $SO_3$ trap status module structured to interpret an $SO_3$ trap regeneration indicator;

a regeneration opportunity module structured to determine that an $SO_3$ trap regeneration is available; and a regeneration control module structured to provide exhaust conditions to remove at least a portion of the trapped $SO_3$.

20. The system of claim 19, wherein the regeneration opportunity module is further structured to determine that the $SO_3$ trap regeneration is available in response to one of the exhaust temperature exceeding 350° C. and an operating condition indicating that an exhaust temperature increase operation is available.

* * * * *